United States Patent
Ohno et al.

(10) Patent No.: US 10,843,408 B2
(45) Date of Patent: Nov. 24, 2020

(54) NOZZLE AND ADDITIVE MANUFACTURING APPARATUS

(71) Applicants: Technology Research Association for Future Additive Manufacturing, Chuo-ku (JP); Kabushiki Kaisha Toshiba, Minato-ku (JP); Toshiba Kikai Kabushiki Kaisha, Chiyoda-ku (JP)

(72) Inventors: Hiroshi Ohno, Chuo (JP); Satoshi Tsuno, Ota (JP); Mitsuo Sasaki, Chigasaki (JP); Tomohiko Yamada, Yokohama (JP); Yasutomo Shiomi, Koza (JP); Shimpei Fujimaki, Mishima (JP)

(73) Assignees: Technology Research Association for Future Additive Manufacturing, Chuo-ku (JP); Kabushiki Kaisha Toshiba, Minato-ku (JP); Toshiba Kikai Kabushiki Kaisha, Chiyoda-ku (JP)

( * ) Notice: Subject to any disclaimer, the term of this patent is extended or adjusted under 35 U.S.C. 154(b) by 112 days.

(21) Appl. No.: 16/131,391

(22) Filed: Sep. 14, 2018

(65) Prior Publication Data

US 2019/0091926 A1 Mar. 28, 2019

(30) Foreign Application Priority Data

Sep. 26, 2017 (JP) .................................. 2017-185420

(51) Int. Cl.
*B29C 64/209* (2017.01)
*B29C 64/153* (2017.01)
(Continued)

(52) U.S. Cl.
CPC .......... *B29C 64/209* (2017.08); *B29C 64/153* (2017.08); *B29C 64/165* (2017.08);
(Continued)

(58) Field of Classification Search
CPC ..... B29C 64/20; B29C 64/205; B29C 64/209; B29C 64/264; B29C 64/268;
(Continued)

(56) References Cited

U.S. PATENT DOCUMENTS

2016/0375521 A1* 12/2016 Sasaki ................... B23K 26/70
219/121.17
2017/0029929 A1* 2/2017 Konyashin ............... B22F 9/04
2017/0120517 A1 5/2017 Shimoyama

FOREIGN PATENT DOCUMENTS

CN 107075687 A 8/2017
JP 2015-178191 10/2015

OTHER PUBLICATIONS

Office Action dated Sep. 2, 2020, in Chinese Patent Application No. 201811107139.0, w/English-language Translation.

* cited by examiner

*Primary Examiner* — Joseph S Del Sole
*Assistant Examiner* — Lawrence D. Hohenbrink, Jr.
(74) *Attorney, Agent, or Firm* — Oblon, McClelland, Maier & Neustadt, L.L.P.

(57) ABSTRACT

A nozzle according to one embodiment has an inner surface and an outer surface, and is provided with a first passage through which an energy ray passes, and a second passage that is provided between the inner surface and the outer surface, and through which powder and fluid pass. The second passage includes a second open end on one end thereof in a first direction. A first surface that is one of the inner surface and the outer surface includes a first edge on one end thereof in the first direction. A second surface that is
(Continued)

is the other one of those includes a second edge on one end thereof in the first direction, and is distanced from the first edge toward the first direction. The fluid ejected from the second open end flows along the second surface, and separates at the second edge.

7 Claims, 6 Drawing Sheets

(51) Int. Cl.
*B29C 64/165* (2017.01)
*B33Y 10/00* (2015.01)
*B29C 64/268* (2017.01)
*B22F 3/105* (2006.01)
*B22F 3/24* (2006.01)
*B29C 64/264* (2017.01)
*B29C 64/205* (2017.01)
*B29C 64/20* (2017.01)
*B29C 64/371* (2017.01)
*B33Y 30/00* (2015.01)

(52) U.S. Cl.
CPC ..... *B22F 3/1055* (2013.01); *B22F 2003/1056* (2013.01); *B22F 2003/1057* (2013.01); *B22F 2003/247* (2013.01); *B22F 2003/248* (2013.01); *B22F 2999/00* (2013.01); *B29C 64/20* (2017.08); *B29C 64/205* (2017.08); *B29C 64/264* (2017.08); *B29C 64/268* (2017.08); *B29C 64/371* (2017.08); *B33Y 10/00* (2014.12); *B33Y 30/00* (2014.12)

(58) Field of Classification Search
CPC ... B29C 64/371; B29C 64/153; B29C 64/165; B33Y 10/00; B33Y 30/00; B22F 3/1055; B22F 2003/1056; B22F 2003/1057; B22F 2003/247; B22F 2003/248; B22F 2999/00
USPC ...................................... 425/375, 174.4, 166
See application file for complete search history.

NOZZLE AND ADDITIVE MANUFACTURING APPARATUS

CROSS-REFERENCE TO RELATED APPLICATIONS

This application is based upon and claims the benefit of priority from Japanese Patent Application No. 2017-185420, filed Sep. 26, 2017, the entire contents of which are incorporated herein by reference.

FIELD

Embodiments described herein relate generally to a nozzle and an additive manufacturing apparatus.

BACKGROUND

Having been known is an additive manufacturing apparatus that feeds powder material from a nozzle, while solidifying the material by irradiating the material with a laser beam, and thereby forming a layer of solidified material. By forming layers of solidified material, a manufactured object having a three-dimensional shape is additively manufactured. A related art example is disclosed in Japanese Patent Application Laid-open No. 2015-178191.

Although the material fed by the nozzle is converged at a processing point that is irradiated with the laser beam, the material sometimes become scattered as the material is ejected from the opening of the nozzle.

SUMMARY

According to one embodiment, a nozzle includes a nozzle unit. The nozzle unit has an inner surface facing an outer side of an axis in a radial direction and an outer surface facing the inner surface with a space therebetween in the radial direction, and that is provided with a first passage that is distanced from the inner surface on an inner side in the radial direction, that extends along the axis, and through which an energy ray passes, and with a second passage that is provided between the inner surface and the outer surface, and through which powder and fluid pass. The first passage includes a first open end that is positioned on an end of the first passage in a first direction along the axis, and that opens to outside of the first passage. The second passage includes a second open end that is positioned on an end of the second passage in the first direction, that is more distanced from the axis than the first open end is, on an outer side in the radial direction, and that opens to outside of the second passage. A first surface that is one of the inner surface and the outer surface includes a first edge that is positioned on one end of the first surface in the first direction. A second surface that is another one of the inner surface and the outer surface includes a second edge that is positioned on one end of the second surface in the first direction, and that is distanced from the first edge on a side toward the first direction, in a direction along the axis. The nozzle unit allows the fluid ejected from the second open end to flow along the second surface, to separate at the second edge, and to depart from the nozzle unit.

DETAILED DESCRIPTION

First Embodiment

A first embodiment will now be explained with reference to FIGS. 1 to 4. Basically, in the description herein, a vertically upward direction is defined as an upward direction, and a vertically downward direction is defined as a downward direction. Furthermore, in the description herein, a plurality of expressions are sometimes used for a component according to the embodiment, or for an explanation of the component. It is also possible to use any expressions other than those mentioned herein for a component or an explanation for which a plurality of expressions are used. Furthermore, it is also possible to use any expressions other than those mentioned herein for a component and an explanation of the component for which a plurality of expressions are not used.

Figure 1:
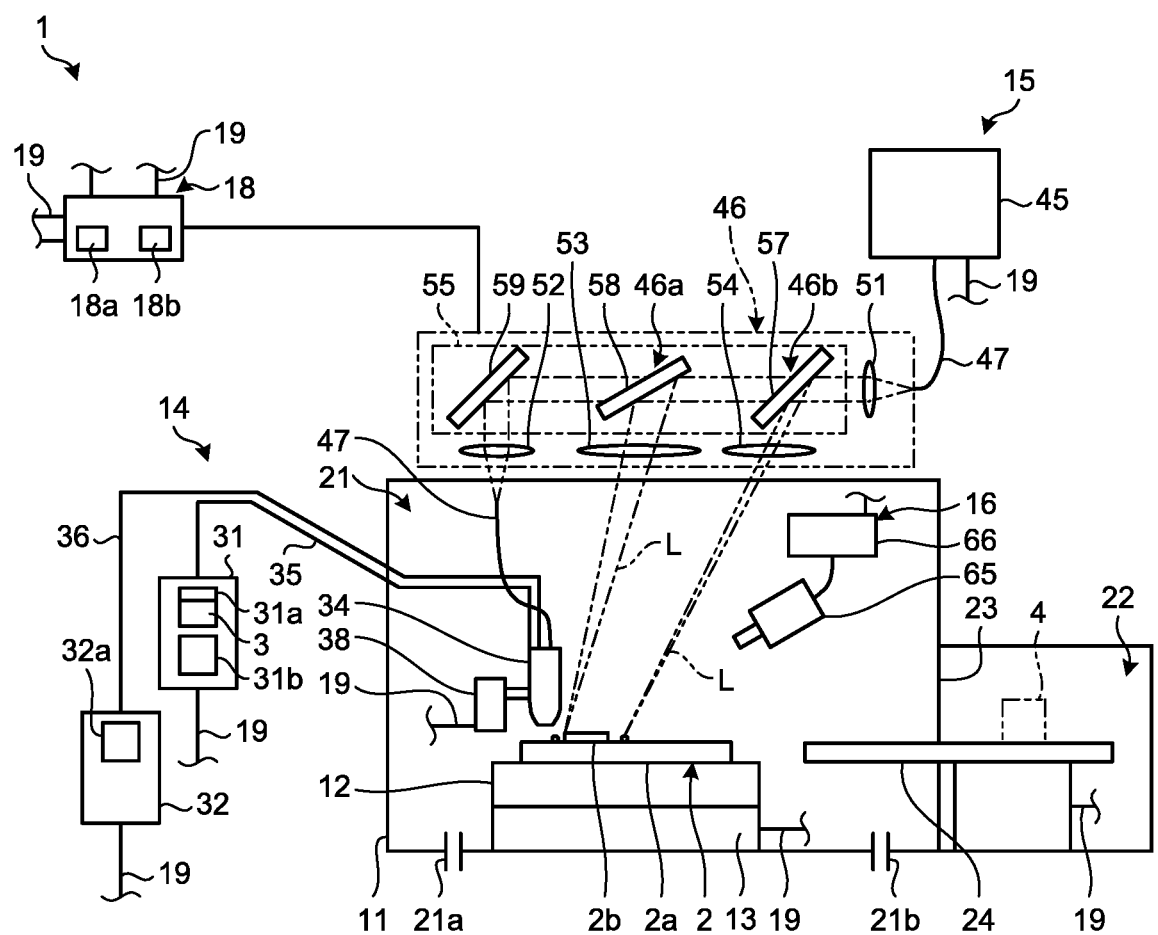
FIG. 1 is an exemplary schematic generally illustrating an additive manufacturing apparatus according to a first embodiment.

FIG. 1 is an exemplary schematic of an additive manufacturing apparatus 1 according to the first embodiment. The additive manufacturing apparatus 1 according to the first embodiment is a three-dimensional printer using laser material deposition. The additive manufacturing apparatus 1 is not limited to this example.

The additive manufacturing apparatus 1 additively manufactures a manufactured object 4 having a predetermined shape, by laying layers of powder material 3 on an object 2, for example. The material 3 is one example of powder. As illustrated in FIG. 1, the additive manufacturing apparatus 1 includes a processing basin 11, a stage 12, a moving device 13, a nozzle device 14, an optical device 15, a measurement device 16, a control device 18, and a plurality of signal lines 19.

In the description herein, an X axis, a Y axis, and a Z axis are defined, as illustrated in the drawings. The X axis, the Y axis, and the Z axis perpendicularly intersecting with one another. The Z axis lies along a vertical direction, for example. The additive manufacturing apparatus 1 may be positioned in such a manner that the Z axis is inclined with respect to the vertical direction.

The material 3 is fed from the nozzle device 14 and laid in layers on the object 2. The material 3 is thermoplastic resin powder, for example. The material 3 is not limited to this example, and may be any other materials, such as another type of synthetic resin, metal, or ceramic. The additive manufacturing apparatus 1 may additively manufacture the manufactured object 4, using a plurality of types of materials 3.

The object 2 is an object to which the material 3 is fed from the nozzle device 14. The object 2 includes a base 2a and a layer 2b. The base 2a is made of a material that is the same as the material 3. The base 2a may also be made of any other material. The base 2a has a plate-like shape and is placed on the stage 12. The layer 2b is made from the material 3 fed from the nozzle device 14, and is laid in layers on the top surface of the base 2a.

The processing basin 11 is provided with a main chamber 21 and a sub-chamber 22. The stage 12, the moving device 13, a part of the nozzle device 14, and the measurement device 16 are arranged inside the main chamber 21. The sub-chamber 22 is provided adjacently to the main chamber 21.

A door 23 is provided between the main chamber 21 and the sub-chamber 22. When the door 23 is opened, the main chamber 21 and the sub-chamber 22 communicate with each other, and when the door 23 is closed, the main chamber 21 and the sub-chamber 22 are separated from each other. The main chamber 21 may be air-tightened when the door 23 is closed.

The main chamber 21 is provided with an inlet 21a and an outlet 21b. A gas feeder, for example, that is positioned outside of the processing basin 11 feeds inert gas, such as nitrogen or argon, into the main chamber 21 through the inlet 21a. A gas exhauster device, for example, that is positioned outside of the processing basin 11 exhausts gas from the main chamber 21 through the outlet 21b. The additive manufacturing apparatus 1 may achieve vacuum in the main chamber 21 by exhausting gas from the main chamber 21 through the outlet 21b.

A conveyor device 24 is provided from the main chamber 21 to the sub-chamber 22. The conveyor device 24 conveys the manufactured object 4 processed in the main chamber 21 to the sub-chamber 22. In other words, the manufactured object 4 processed in the main chamber 21 becomes housed in the sub-chamber 22. After the manufactured object 4 becomes housed in the sub-chamber 22, the door 23 is closed, and the sub-chamber 22 and the main chamber 21 are separated from each other.

The stage 12 supports the object 2. The stage 12 also supports the additively manufactured object 4. The moving device 13 moves the stage 12 in the three-axial directions that perpendicularly intersect with one another, for example. Furthermore, the moving device 13 may rotate the stage 12 about two axes that perpendicularly intersect with each other.

The nozzle device 14 feeds the material 3 onto the object 2 that is placed on the stage 12. A laser beam L is output from the nozzle device 14 to the material 3 fed and the object 2 placed on the stage 12. The laser beam L is one example of an energy ray.

The laser beam L is output from the nozzle device 14, in parallel with feeding of the material 3. Without limitation to the laser beam L, any other energy ray may be output from the nozzle device 14. The energy ray may be any energy ray as long as the ray is capable of melting or sintering the material, as the laser beam L is, and may be an electron beam or an electromagnetic wave within the ranges of microwaves to ultraviolet, for example.

The nozzle device 14 includes a material feeder device 31, a fluid feeder device 32, a nozzle 34, a material feeder tube 35, a fluid feeder tube 36, and a moving mechanism 38. The material feeder device 31 is one example of a feeder device. The nozzle 34 is one example of a nozzle and a nozzle unit.

The material feeder device 31 includes a tank 31a and a material feeder unit 31b. The tank 31a stores therein the material 3. The material feeder unit 31b feeds the material 3 in the tank 31a to the nozzle 34 through the material feeder tube 35. In other words, the material feeder unit 31b is enabled to feed the material 3 onto the object 2 from the nozzle 34.

The material feeder unit 31b feeds the material 3 into the nozzle 34 with carrier gas, for example. The carrier gas is inert gas such as nitrogen or argon. In this manner, the material feeder unit 31b includes, for example, a tank that stores therein the carrier gas, a pump that feeds the carrier gas in the tank to the material feeder tube 35, and a device that feeds the material 3 from the tank 31a into the flow of the carrier gas. The material feeder unit 31b may feed the material 3 into the nozzle 34 using any other means.

The fluid feeder device 32 includes a fluid feeder unit 32a. The fluid feeder unit 32a feeds purge gas that is fluid to the nozzle 34 via the fluid feeder tube 36. The purge gas is inert gas such as nitrogen or argon. In this manner, the fluid feeder unit 32a includes, for example, a tank that stores therein purge gas, and a pump that feeds the purge gas in the tank to the fluid feeder tube 36.

Figure 2:
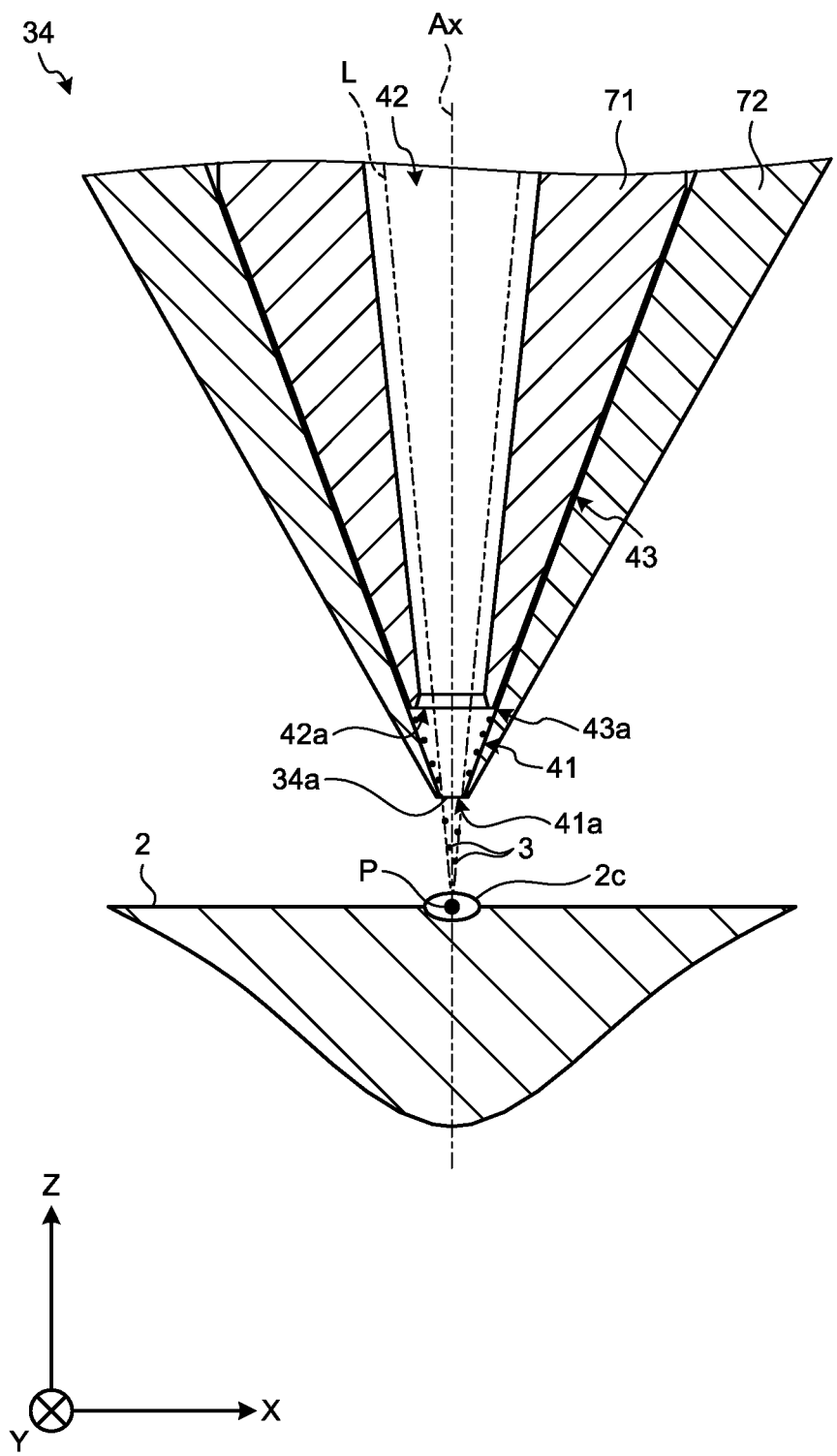
FIG. 2 is an exemplary sectional view illustrating a part of the nozzle and a part of an object according to the first embodiment.
Figure 3:
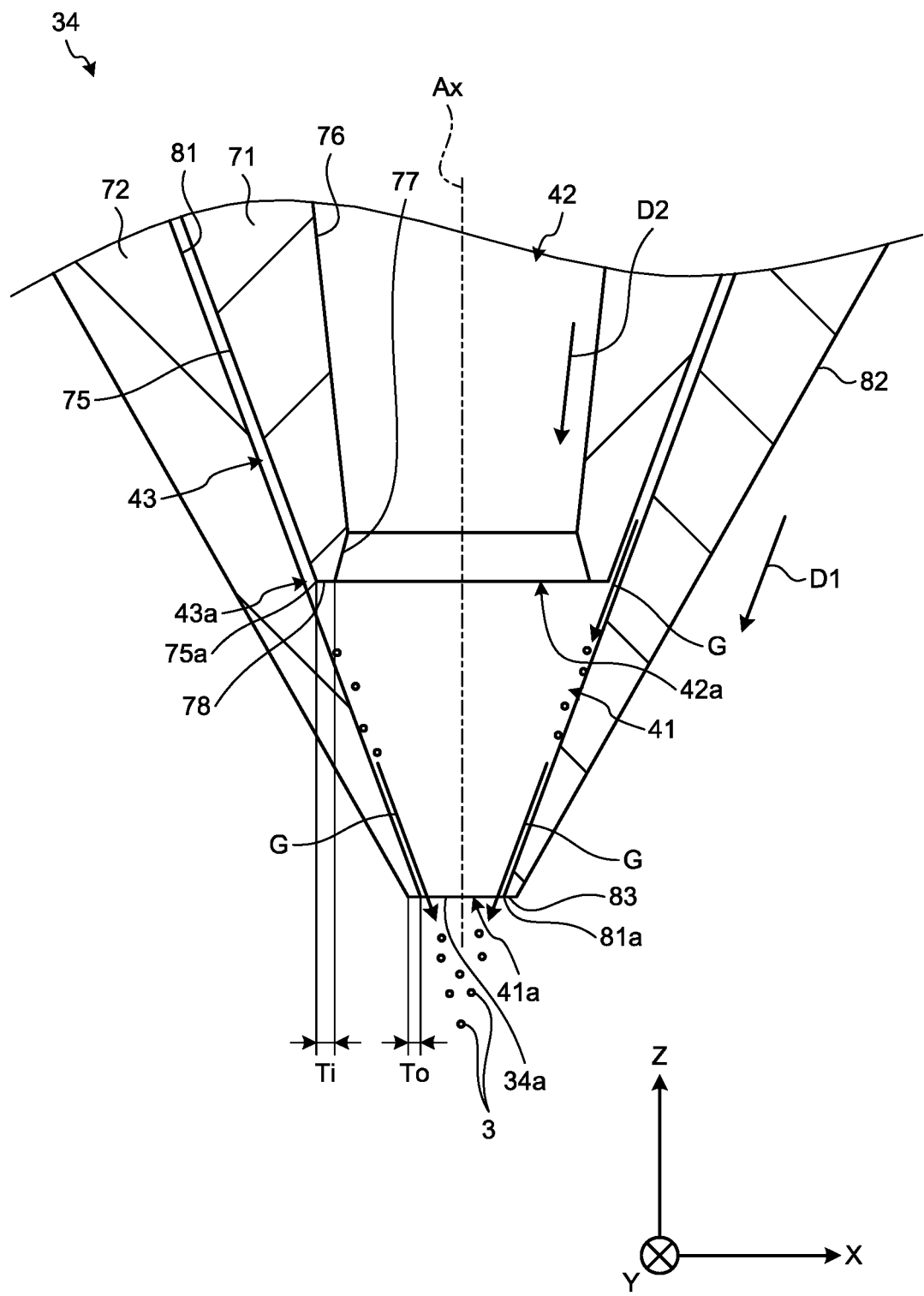
FIG. 3 is an exemplary sectional view illustrating a part of the nozzle according to the first embodiment.

FIG. 2 is an exemplary sectional view illustrating a part of the nozzle 34 and a part of the object 2 according to the first embodiment. FIG. 3 is an exemplary sectional view illustrating a part of the nozzle 34 according to the first embodiment. As illustrated in FIGS. 2 and 3, the nozzle 34 is disposed inside the main chamber 21, and has a substantially tubular shape extending along the central axis Ax. The central axis Ax is one example of an axis, and extends along the Z axis. The central axis Ax may also extend diagonally with respect to the Z axis.

A tip 34a of the nozzle 34 is directed toward the object 2 with a space therebetween. The tip 34a is an end of the nozzle 34, in the negative direction of the Z axis (the direction opposite to the arrow indicating the Z axis; the downward direction in FIG. 2). The negative direction of the Z axis is a direction along the central axis Ax, and is one example of a first direction.

The nozzle 34 is provided with a passage 41, a beam output path 42, and an ejection path 43. The passage 41 is one example of a third passage. The beam output path 42 is one example of a first passage. The ejection path 43 is one example of a second passage.

The passage 41 is a hole extending along the central axis Ax, and having a substantially circular cross section. The inner diameter of the passage 41 becomes smaller toward the tip 34a. The passage 41 has an opening 41a. The opening 41a is one example of a third open end. The opening 41a is positioned on an end of the passage 41 in the negative direction of the Z axis. The opening 41a represents a portion where the passage 41 opens to the outside of the nozzle 34, at the tip 34a of the nozzle 34.

The passage 41 is communicated with the beam output path 42 and the ejection path 43. In other words, the beam output path 42 and the ejection path 43 merge with each other in the passage 41. The beam output path 42 and the ejection path 43 are not limited to this example.

The beam output path 42 is provided inside the nozzle 34, and is a hole having a substantially circular cross section and extending in the central axis Ax. The inner diameter of the beam output path 42 becomes smaller toward the tip 34a. The inner diameter of the beam output path 42 may also remain constant.

The beam output path 42 has a beam output opening 42a. The beam output opening 42a is one example of a first open end. The beam output opening 42a is positioned on one end of the beam output path 42 in the negative direction of the Z axis. The beam output opening 42a opens to the outside of the beam output path 42, and is communicated with the passage 41. The laser beam L passes through the beam output path 42, and enters the passage 41 through the beam output opening 42a.

The beam output path 42 is communicated with the fluid feeder tube 36 illustrated in FIG. 1. This configuration allows the fluid feeder unit 32a to feed purge gas into the beam output path 42 via the fluid feeder tube 36. The purge gas passes through the beam output path 42, together with the laser beam L, and is ejected to the passage 41 via the beam output opening 42a.

The ejection path 43 is provided inside the nozzle 34, and is a hole extending along the central axis Ax and having a substantially ring-shaped cross section. The ejection path 43 is more distanced from the central axis Ax than the beam output path 42 is, on the outer side of the central axis Ax in the radial direction, and is provided in a manner surrounding the beam output path 42. The radial direction is a direction that perpendicularly intersects with the central axis Ax.

The ejection path 43 has an ejection opening 43a. The ejection opening 43a is one example of a second open end. The ejection opening 43a is positioned on one end of the ejection path 43 in the negative direction of the Z axis. The ejection opening 43a opens to the outside of the ejection path 43, and is communicated with the passage 41.

The ejection path 43 is communicated with the material feeder tube 35 illustrated in FIG. 1. Therefore, the material feeder unit 31b feeds carrier gas G and the material 3 into the ejection path 43 via the material feeder tube 35. The carrier gas G is one example of fluid. As indicated by the arrow in FIG. 3, the carrier gas G and the material 3 fed by the material feeder unit 31b pass through the ejection path 43 and are discharged to the passage 41 via the ejection opening 43a.

As described above, the laser beam L is ejected to the passage 41 via the beam output opening 42a, and the carrier gas G and the material 3 are ejected to the passage 41 via the ejection opening 43a. The laser beam L, the carrier gas G, and the material 3 pass through the passage 41, and go outside of the nozzle 34 from the opening 41a.

The moving mechanism 38 illustrated in FIG. 1 moves the nozzle 34 in the three-axial directions that perpendicularly intersect with one another. The moving mechanism 38 may also rotate the nozzle 34 about two axes that perpendicularly intersects with each other. In other words, the moving mechanism 38 moves the nozzle 34 relatively to the stage 12. The moving device 13 also moves the nozzle 34 relatively to the stage 12.

The optical device 15 has a light source 45, an optical system 46, a plurality of cables 47. The light source 45 has an oscillator and emits the laser beam L with the oscillation of the oscillator. The light source 45 can change the power of the laser beam L to be output. The light source 45 may also be enabled to change (select) the wavelength of the laser beam L to be output.

The light source 45 is connected to the optical system 46 via the cables 47 such as hollow fibers. The light source 45 causes the output laser beam L to become incident on the optical system 46 via the cables 47. The laser beam L is passed through the optical system 46 and enters the nozzle 34.

The optical system 46 irradiates the object 2 or the material 3 sprayed toward the object 2 with the laser beam L output from the light source 45, via the beam output path 42 in the nozzle 34. In this manner, the optical device 15 supplies the laser beam L into the beam output path 42 in the nozzle 34, and enables the laser beam L to be output from the beam output opening 42a.

The optical system 46 includes, for example, a first lens 51, a second lens 52, a third lens 53, a fourth lens 54, and a galvano scanner 55. The first lens 51, the second lens 52, the third lens 53, and the fourth lens 54 are fixed. The optical system 46 may be provided with an adjusting device enabled to move the first lens 51, the second lens 52, the third lens 53, and the fourth lens 54 in two-axis directions intersecting (perpendicularly) with the light path, for example.

The first lens 51 collimates the laser beam L that has become incident on the optical system 46 via the cables 47 to a parallel beam. The collimated laser beam L then becomes incident on the galvano scanner 55.

Each of the second lens 52, the third lens 53, and the fourth lens 54 converges the laser beam L output from the galvano scanner 55. The laser beam L converged by the second lens 52 passes through the cables 47 and reaches the nozzle 34. The object 2 is irradiated with the laser beam L that is converged by the third lens 53 and the laser beam L that is converged by the fourth lens 54.

The galvano scanner 55 splits the collimate light collimated by the first lens 51 into light to be incident on the second lens 52, light to be incident on the third lens 53, and light to be incident on the fourth lens 54. The galvano scanner 55 includes a first galvano mirror 57, a second galvano mirror 58, and a third galvano mirror 59. Each of the galvano mirrors 57, 58, 59 is configured to split light, and are enabled to change their inclination angles (output angles).

The first galvano mirror 57 transmits a part of the laser beam L passed through the first lens 51, and outputs the transmitted laser beam L to the second galvano mirror 58. The first galvano mirror 57 reflects the other part of laser beam L, and outputs the reflected laser beam L to the fourth lens 54. The first galvano mirror 57 changes a position to be irradiated with the laser beam L having transmitted the fourth lens 54, based on the inclination angle of the first galvano mirror 57.

The second galvano mirror 58 transmits a part of the laser beam L having transmitted through the first galvano mirror 57, and outputs the transmitted laser beam L to the third galvano mirror 59. The second galvano mirror 58 reflects the other part of the laser beam L, and outputs the reflected laser beam L to the third lens 53. The second galvano mirror 58 changes a position to be irradiated with the laser beam L transmitted through the third lens 53, based on the inclination angle of the second galvano mirror 58.

The third galvano mirror 59 reflects the laser beam L having transmitted through the second galvano mirror 58, and outputs the reflected laser beam L to the second lens 52.

The optical system 46 has a melting device 46a including the first galvano mirror 57, the second galvano mirror 58, and the third lens 53. The melting device 46a forms a layer 2b and performs an annealing process, by heating the material 3 having been supplied to the object 2 from the nozzle 34 by irradiating the material 3 with the laser beam L.

The optical system 46 also has a removing device 46b including the first galvano mirror 57 and the fourth lens 54. The removing device 46b removes an unnecessary part that is formed on the base 2a or the layer 2b, by irradiating that part with the laser beam L.

The removing device 46b removes parts that are not included in a predetermined shape of the manufactured object 4, such as an unnecessary part formed with the material 3 scattered while the material 3 is being fed from the nozzle 34, or formed while the layer 2b is being formed, for example. The removing device 46b outputs the laser beam L at a power capable of removing such unnecessary parts.

The measurement device 16 measures the shape of the solidified layer 2b and the shape of the manufactured object 4 having been manufactured. The measurement device 16 transmits the information of the measured shapes to the control device 18. The measurement device 16 includes, for example, a camera 65 and an image processing apparatus 66. The image processing apparatus 66 performs image processing based on the information measured with the camera 65. The measurement device 16 measures the shapes of the layer 2b and the manufactured object 4 using method such as interferometry or light-section method.

The control device 18 is electrically connected to the moving device 13, the conveyor device 24, the material feeder device 31, the fluid feeder device 32, the moving mechanism 38, the light source 45, the galvano scanner 55, and the image processing apparatus 66, via the signal lines 19.

The control device 18 includes a control unit 18a such as a central processing unit (CPU), a storage unit 18b such as a read-only memory (ROM), a random access memory (RAM), and a hard disk drive (HDD), and other various types of devices. By causing the CPU to execute a computer program incorporated in the ROM or the HDD, the control unit 18a controls each unit in the additive manufacturing apparatus 1.

The control unit 18a moves the stage 12 in the three-axial directions by controlling the moving device 13. The control unit 18a conveys the manufactured object 4 having been manufactured to the sub-chamber 22 by controlling the conveyor device 24.

The control unit 18a adjusts to feed or not to feed the material 3, and an amount to be fed, by controlling the material feeder device 31. The control unit 18a adjusts to feed or not to feed purge gas, and an amount to be fed, by controlling the fluid feeder device 32.

The control unit 18a controls the position of the nozzle 34 by controlling the moving mechanism 38. The control unit 18a adjusts the inclination angles of the first galvano mirror 57, the second galvano mirror 58, and the third galvano mirror 59 by controlling the galvano scanner 55.

The control unit 18a adjusts the power of the laser beam L output from the light source 45, by controlling the light source 45. The control unit 18a may adjust the wavelength of the laser beam L output from the light source 45 by controlling the light source 45.

A storage unit 18b stores therein data indicating the shape (reference shape) of the object 4 to be manufactured, for example. The storage unit 18b also stores therein data indicating the heights of the nozzle 34 and the stage 12 for each three-dimensional processing position (each point).

The control unit 18a may be provided with a function for selectively feeding a plurality of different materials 3 from the nozzle 34, and adjusting the ratio of the materials 3. This function allows an object to be formed with a graded material in which the ratio of a plurality of materials 3 changes depending on the positions in the manufactured object 4.

The control unit 18a is provided with a function for determining the shape of the layer 2b or the manufactured object 4. For example, the control unit 18a determines whether any part that is not included in the predetermined shape has been formed, by comparing the shape of the layer 2b or the manufactured object 4 acquired by the measurement device 16, with the reference shape stored in the storage unit 18b.

The control unit 18a is also provided with a function for trimming and polishing the layer 2b or the manufactured object 4 into a predetermined shape by removing the unnecessary part, which has been determined as not included in the predetermined shape as a result of the determination of the shape of the layer 2b or the manufactured object 4. For example, the control unit 18a controls the light source 45 in such a manner that the laser beam L output from the fourth lens 54 via the first galvano mirror 57 to the part not included in the predetermined shape of the layer 2b or the manufactured object 4 has a power enabling the material 3 to evaporate. The control unit 18a controls the first galvano mirror 57 so that the part is irradiated with the laser beam L, and evaporates.

Figure 4:
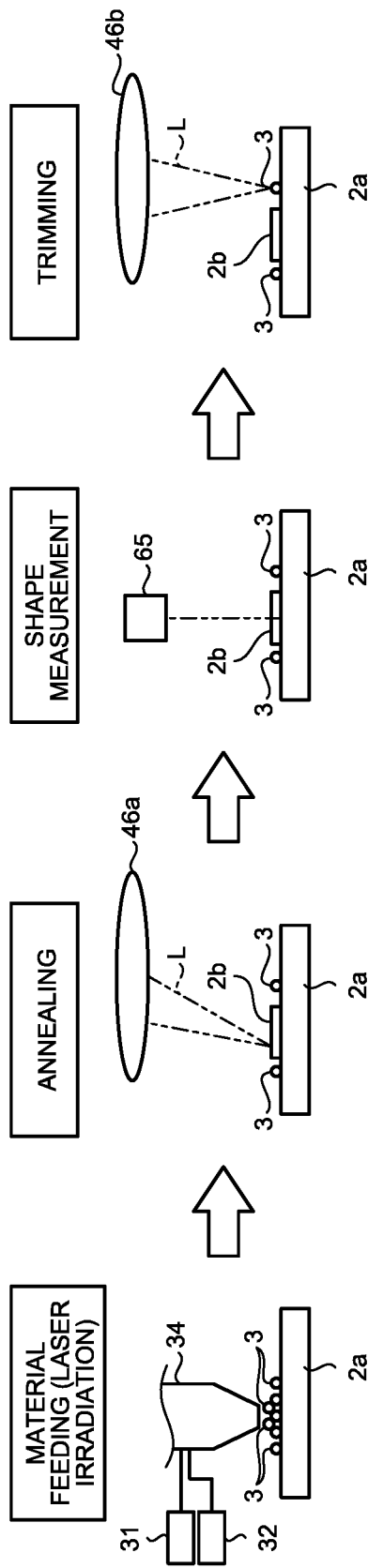
FIG. 4 is an exemplary schematic generally illustrating one example of the sequence of a manufacturing process performed by the additive manufacturing apparatus according to the first embodiment.

One example of the method for manufacturing the manufactured object 4 using the additive manufacturing apparatus 1 will now be explained with reference to FIG. 4. FIG. 4 is an exemplary schematic of one example of the sequence of the manufacturing process (manufacturing method) performed by the additive manufacturing apparatus 1 according to the first embodiment.

As illustrated in FIG. 4, to begin with, the additive manufacturing apparatus 1 feeds the material 3, and outputs the laser beam L. The control unit 18a controls the material feeder device 31 and the nozzle 34 in such a manner that the material 3 is fed by the nozzle 34 to a predetermined range. The control unit 18a also controls the light source 45 and the optical system 46 in such a manner that the laser beam L melts or sinters the fed material 3.

As illustrated in FIG. 2, the optical system 46 enables the material 3 sprayed from the nozzle 34 to be irradiated with the laser beam L via the nozzle 34. The material 3 having been ejected from the ejection opening 43a of the nozzle 34, having passed through the passage 41, and having been sprayed from the opening 41a is supplied to an area on which the layer 2b on the base 2a is to be formed, while being preliminarily heated by the laser beam L. The material 3 having molten while being scattered is also permitted to reach the object 2.

The material 3 supplied to the object 2 become molten or sintered, and aggregates together by being irradiated with the laser beam L. The aggregation of the material 3 forms a molten region 2c. The molten region 2c may include not only the fed material 3 but also a part of the base 2a or the layer 2b irradiated with the laser beam L. The molten region 2c may also include not only the completely molten material 3 but also pieces of partially molten material 3 joined together.

When the molten region 2c solidifies, a layer-like or a thin-film like aggregation of the material 3 is formed on the base 2a or the layer 2b. By being cooled by the thermal transfer to the aggregation of the material 3, the material 3 may be formed into a granular layer, and into a granular aggregation.

The additive manufacturing apparatus 1 then performs an annealing process, as illustrated in FIG. 4. The control unit 18a controls the light source 45 and the melting device 46a in such a manner that the aggregation of the material 3 on the base 2a is irradiated with the laser beam L. The aggregation of the material 3 is melted or sintered again by the laser beam L, and solidifies into a layer 2b. In this manner, the optical system 46 forms a layer 2b of the material 3, by irradiating the material 3 with the laser beam L output from the light source 45 and melting or sintering and solidifying the material 3.

The additive manufacturing apparatus 1 then performs a shape measurement. The control unit 18a controls the measurement device 16 to measure the material 3 on the base 2a after the annealing process. The control unit 18a compares the shape of the layer 2b or the manufactured object 4 acquired by the measurement device 16 with the reference shape stored in the storage unit 18b.

The additive manufacturing apparatus 1 then performs trimming. If it is determined that the material 3 is attached to a position that is different from that in the predetermined shape, on the base 2a, through the comparison between the shape measurement and the reference shape, for example, the control unit 18a controls the light source 45 and the removing device 46b in such a manner that the unnecessary material 3 is caused to evaporate. If the layer 2b is determined to have the predetermined shape through the comparison between the shape measurement and the reference shape, the control unit 18a skips the trimming.

Once the formation of the layer 2b described above is completed, the additive manufacturing apparatus 1 forms another new layer 2b on the layer 2b. The additive manufacturing apparatus 1 manufactures the manufactured object 4 additively, by forming the layers 2b repeatedly.

The nozzle 34 will now be explained more in detail. As illustrated in FIG. 3, the nozzle 34 includes a first tubular portion 71 and a second tubular portion 72. In this embodiment, the first tubular portion 71 and the second tubular portion 72 are separate components. Without limitation to this example, the first tubular portion 71 and the second tubular portion 72 may be provided as one component.

The first tubular portion 71 is made of a metal such as brass. The second tubular portion 72 is made of a metal such as tungsten. The melting point of the second tubular portion 72 is higher than that of the first tubular portion 71. The melting points of the first tubular portion 71 and the second tubular portion 72 are not limited to this example.

The first tubular portion 71 has a substantially tubular shape extending along the central axis Ax. The first tubular portion 71 is provided with the beam output path 42 of the nozzle 34. The first tubular portion 71 has an inner surface 75, a first inner circumferential surface 76, a second inner circumferential surface 77, and a first end 78.

The inner surface 75 is an outer circumferential surface of the first tubular portion 71 having a tubular shape. Therefore, the inner surface 75 is a substantially tubular surface that is continuous in the circumferential direction of the central axis Ax, and faces outside of the nozzle 34 in the radial direction. In other words, the inner surface 75 is oriented in a direction departing from the central axis Ax. The circumferential direction is a direction rotating about the central axis Ax.

The inner surface 75 has a substantially cylindrical shape having an outer diameter becoming smaller as the distance to the first end 78 becomes smaller. In other words, the inner surface 75 is a substantially conical surface extending in a first converging direction D1 that approaches the central axis Ax as the direction is extended further in the negative direction of the Z axis. The first converging direction D1 is one example of a second direction. The inner surface 75 is not limited to this example.

The inner surface 75 has a first lower edge 75a. The first lower edge 75a is positioned on one end of the inner surface 75 in the negative direction of the Z axis. In the first embodiment, the inner surface 75 is one example of a first surface, and the first lower edge 75a is one example of a first edge.

As described above, the inner surface 75 is a conical surface. Therefore, in the cross section including the central axis Ax as illustrated in FIG. 3, the contour line of the inner surface 75 can be expressed as a differentiable function having continuity in the X-Z coordinate system defined by the X axis and the Z axis illustrated in FIG. 3. The contour line may also be referred to as a generating line or an edge of the cross section, for example. The inner surface 75 is a surface that can be expressed as a totally differentiable function. The inner surface 75 may have another shape such as a curving surface having a contour line that can be expressed as a differentiable function having continuity, and having a convex shape in a direction approaching the central axis Ax or having a convex shape in a direction departing from the central axis Ax, in the cross section including the central axis Ax, for example.

The first inner circumferential surface 76 and the second inner circumferential surface 77 are inner circumferential surfaces of the first tubular portion 71 having a tubular shape, and are inner circumferential surfaces of the nozzle 34. The first inner circumferential surface 76 and the second inner circumferential surface 77 are positioned on the opposite side of the inner surface 75, and faces the inner side of the nozzle 34 in the radial direction. In other words, the first inner circumferential surface 76 and the second inner circumferential surface 77 are oriented in a direction approaching the central axis Ax.

The beam output path 42 is provided on the tubular inner side of the first tubular portion 71. The first inner circumferential surface 76 and the second inner circumferential surface 77 define the beam output path 42, and faces the inside of the beam output path 42. The beam output path 42 is distanced from the inner surface 75 on the inner side in the radial direction.

The first inner circumferential surface 76 has a substantially cylindrical shape having an outer diameter becoming smaller as the distance to the first end 78 becomes smaller. In other words, the first inner circumferential surface 76 is a substantially conical surface that extends in a second converging direction D2 that approaches the central axis Ax as the direction is extended further in the negative direction of the Z axis. The angle by which second converging direction D2 and the central axis Ax intersect with each other is smaller than the angle by which the first converging direction D1 and the central axis Ax intersect with each other.

The second inner circumferential surface 77 is positioned between the first inner circumferential surface 76 and the first end 78. An end of the second inner circumferential surface 77 in the positive direction of the Z axis is connected to the first inner circumferential surface 76. An end of the second inner circumferential surface 77 in the negative direction of the Z axis is connected to the first end 78.

The second inner circumferential surface 77 extends in a direction approaching the inner surface 75, toward the negative direction of the Z axis. In this embodiment, the second inner circumferential surface 77 is a conical surface that extends in a direction becoming more distanced from the central axis Ax as the direction is extended further in the negative direction of the Z axis. The second inner circumferential surface 77 is not limited to this example.

The first end 78 is positioned on one end of the first tubular portion 71 in the negative direction of the Z axis. In this embodiment, the first end 78 is a substantially ring-shaped end surface of the first tubular portion 71, in the negative direction of the Z axis. The beam output opening 42a opens on the first end 78.

The inner surface 75 is connected to the first end 78 at the first lower edge 75a. In other words, the inner surface 75 extends from the first end 78. The second inner circumferential surface 77 also extends from the first end 78. The inner surface 75 and the second inner circumferential surface 77 are not limited to this example.

A wall thickness of the first tubular portion 71 becomes smaller toward the negative direction of the Z axis. In other words, the distance between the inner surface 75 and the first inner circumferential surface 76 or the second inner circumferential surface 77 in the radial direction becomes smaller toward the negative direction of the Z axis. The first tubular portion 71 is not limited to this example.

The second tubular portion 72 has a substantially tubular shape extending along the central axis Ax. The second tubular portion 72 surrounds the first tubular portion 71 with a space therebetween. In other words, the second tubular portion 72 extends along the central axis Ax, on the outer side of the first tubular portion 71. The second tubular portion 72 has an outer surface 81, an outer circumferential surface 82, and a second end 83.

The outer surface 81 is the inner circumferential surface of the second tubular portion 72 having a tubular shape. The outer surface 81 faces the inner side of the nozzle 34 in the radial direction. In other words, the outer surface 81 is oriented in a direction that is opposite of the direction in which the inner surface 75 is oriented, and in the direction that approaches the central axis Ax.

The outer surface 81 has a substantially cylindrical shape having an inner diameter that becomes smaller as the distance to the second end 83 becomes smaller. In other words, the outer surface 81 is a substantially conical surface extending in the first converging direction D1 that approaches the central axis Ax as the direction is extended further in the negative direction of the Z axis. The outer surface 81 is not limited to this example.

As mentioned above, the inner surface 75 of the first tubular portion 71 and the outer surface 81 of the second tubular portion 72 both extend in the first converging direction D1. In other words, the inner surface 75 and the outer surface 81 are inclined by the same angle with respect to the central axis Ax, and the inner surface 75 and the outer surface 81 are surfaces extending substantially in parallel. The inner surface 75 and the outer surface 81 may be inclined with respect to the central axis Ax by different inclination angles.

The outer surface 81 has a second lower edge 81a. The second lower edge 81a is positioned on one end of the outer surface 81 in the negative direction of the Z axis. In the first embodiment, the outer surface 81 is one example of a second surface, and the second lower edge 81a is one example of a second edge.

As described above, the outer surface 81 is a conical surface. Therefore, in the cross section including the central axis Ax as illustrated in FIG. 3, the contour line of the outer surface 81 can be expressed as a differentiable function in the X-Z coordinate system defined by the X axis and the Z axis illustrated in FIG. 3. Furthermore, the outer surface 81 is a surface that can be expressed as a totally differentiable function. The outer surface 81 may also have another shape such as a curving surface having a contour line that can be expressed as a differentiable function in the cross section including the central axis Ax, and having a convex shape in a direction approaching the central axis Ax or having a convex shape in a direction departing from the central axis Ax, for example.

The outer circumferential surface 82 is an outer circumferential surface of the second tubular portion 72 having a tubular shape, and is the outer circumferential surface of the nozzle 34. Therefore, the outer circumferential surface 82 is a substantially tubular surface that is continuous in the circumferential direction of the central axis Ax, is positioned on the opposite side of the outer surface 81, and faces the outer side of the nozzle 34 in the radial direction. In other words, the outer circumferential surface 82 faces a direction departing from the central axis Ax. The outer circumferential surface 82 has a substantially cylindrical shape having an outer diameter becoming smaller as the distance to the second end 83 becomes smaller.

The second end 83 is positioned on one end of the second tubular portion 72 in the negative direction of the Z axis. In this embodiment, the second end 83 is a substantially ring-shaped end surface of the second tubular portion 72, in the negative direction of the Z axis.

The second end 83 forms the tip 34a of the nozzle 34. The tip 34a is not limited to this example. The opening 41a opens on the second end 83. The second end 83 is oriented in the negative direction of the Z axis, and faces the object 2 with a space therebetween. The second end 83 is distanced from the first end 78 in the negative direction of the Z axis.

The outer surface 81 is connected to the second end 83 at the second lower edge 81a. In other words, the outer surface 81 extends from the second end 83. The outer circumferential surface 82 also extends from the second end 83. The outer surface 81 and the outer circumferential surface 82 are not limited to this example.

A wall thickness of the second tubular portion 72 becomes smaller toward the negative direction of the Z axis. In other words, the distance between the outer surface 81 and the outer circumferential surface 82 in the radial direction becomes smaller toward the negative direction of the Z axis. The second tubular portion 72 is not limited to this example.

A thickness To of the second tubular portion 72 on the second end 83 is smaller than a thickness Ti of the first tubular portion 71 in the first end 78. In other words, in the radial direction, the distance between the outer surface 81 and the outer circumferential surface 82 on the second end 83 is smaller than the distance between the inner surface 75 and the second inner circumferential surface 77 on the first end 78.

A part of the outer surface 81 of the second tubular portion 72 faces the inner surface 75 of the first tubular portion 71 with a space therebetween. The ejection path 43 is provided between the inner surface 75 and the part of the outer surface 81. In other words, the inner surface 75 and the part of the outer surface 81 define at least a part of the ejection path 43.

The ejection path 43 provided between the inner surface 75 and the outer surface 81 extends along the first converging direction D1. Therefore, the carrier gas G and the material 3 fed by the material feeder device 31 illustrated in FIG. 1 flows through the ejection path 43 in the first converging direction D1.

The ejection opening 43a of the ejection path 43 is defined by the first lower edge 75a of the inner surface 75 in the first tubular portion 71 and the outer surface 81 of the second tubular portion 72. The ejection opening 43a is not limited to this example. The ejection opening 43a is more distanced from the central axis Ax than the beam output opening 42a of the beam output path 42 is, on the outer side in the radial direction.

A part of the outer surface 81 in the second tubular portion 72, that includes the second lower edge 81a, defines at least a part of the passage 41. Furthermore, the opening 41a of the passage 41 is defined by the second lower edge 81a of the outer surface 81. The opening 41a is not limited to this example. In the direction along the central axis Ax, the second lower edge 81a is distanced from the first lower edge 75a of the inner surface 75, on the side toward the negative direction of the Z axis.

The inner diameter of the opening 41a is smaller than the inner diameter of the beam output opening 42a. In other words, the opening 41a is smaller than the beam output opening 42a. Alternatively, the inner diameter of the opening 41a may be the same as or larger than the inner diameter of the beam output opening 42a.

As described above, a part of the outer surface 81 defines at least a part of the ejection path 43, and is positioned in the ejection path 43. By contrast, a part of the outer surface 81, that includes the second lower edge 81a, defines the passage 41 and is positioned in the passage 41. With such a configuration, the outer surface 81 continues from the inside of the ejection path 43 to the passage 41 that is the outside of the ejection path 43. Therefore, as indicated by the arrows in FIG. 3, the flow of the carrier gas G ejected from the ejection opening 43a follows the outer surface 81, due to the Coanda effect, for example. In addition to the Coanda effect, for example, the pressure of the purge gas ejected from the beam output opening 42a causes the flow of the carrier gas G to follow the outer surface 81.

Fluid flows along a surface having a contour line that can be expressed as a differentiable function having continuity, due to the Coanda effect. In other words, fluid flows along a surface that can be expressed as a totally differentiable function. When fluid reaches an edge of a surface having a contour line that can be expressed as a differentiable function having continuity, the fluid becomes separated from the edge.

The outer surface 81 has contour line that can be expressed as a differentiable function having continuity, in the cross section including the central axis Ax. By contrast, when the outer surface 81 and the second end 83 are considered as one surface, the outer surface 81 and the second end 83 are continuous across the second lower edge 81a, but are not differentiable. In other words, the outer surface 81 and the second end 83 are not smoothly continuous. Therefore, the flow of the carrier gas G following the outer surface 81 become separated at the second lower edge 81a, and departs from the nozzle 34.

The flow of the carrier gas G departed from the nozzle 34 at the second lower edge 81a generally flows in the first converging direction D1. The material 3 ejected via the ejection opening 43a is carried by the carrier gas G, flows along the outer surface 81 in the first converging direction D1, and is ejected outside of the nozzle 34 from the opening 41a that is defined by the second lower edge 81a.

In this embodiment, the first converging direction D1 is a direction that approaches the central axis Ax as this direction is extended further in the negative direction of the Z axis. Therefore, the flow of the carrier gas G departed from the nozzle 34 at the second lower edge 81a and the material 3 carried by the carrier gas G approach the central axis Ax as the carrier gas G and the material 3 travel further in the negative direction of the Z axis. As a result, the material 3 carried by the carrier gas G becomes collected at a processing point P illustrated in FIG. 2. The processing point P is positioned on the central axis Ax, and is positioned on the object 2 or inside the object 2. By allowing the processing point P or a vicinity of the processing point P to be irradiated with the laser beam L, the material 3 ejected from the nozzle 34 becomes molten or sintered by the laser beam L.

In the additive manufacturing apparatus 1 provided with the nozzle 34 according to the first embodiment explained above, the ejection path 43 is provided between the inner surface 75 and the outer surface 81, and the outer surface 81 includes the second lower edge 81a that is distanced from the first lower edge 75a on the side toward the negative direction of the Z axis, in the direction along the central axis Ax. The carrier gas G ejected from the ejection opening 43a flows along the outer surface 81, becomes separated at the second lower edge 81a, and departs from the nozzle 34. In other words, the Coanda effect enables the carrier gas G ejected from the ejection opening 43a to flow along one of the inner surface 75 and the outer surface 81, whichever having a longer surface in the negative direction of the Z axis. The Coanda effect ends at the second lower edge 81a, and the carrier gas G departs from the nozzle 34, and is released toward the object 2. Therefore, the nozzle 34 according to the embodiment enables the material 3 and the carrier gas G to become converged by following the inner surface 75 or the outer surface 81, and therefore, the material 3 can be fed to a more precise region. For example, the additive manufacturing apparatus 1 as disclosed in the embodiment can additively manufacture at a higher resolution (lamination pitch). Furthermore, the first tubular portion 71 having the inner surface 75 in the nozzle 34 can be reduced in length, and therefore, the weight of the nozzle 34 can be reduced further.

The beam output opening 42a and the ejection opening 43a communicate with the passage 41, and the opening 41a of the passage 41 is smaller than the beam output opening 42a. In other words, because the beam output opening 42a through which the laser beam L passes has a larger size, the laser beam L interferes less with the nozzle 34. Therefore, it is possible to suppress the degree by which the nozzle 34 is damaged by the laser beam L, to increase the output power of the laser beam L, so that the laser beam L can melt the material 3 with a higher melting point, and to suppress generations of spatters. Furthermore, when the diameter of the laser beam L is increased, the laser beam L can melt or sinter the material 3 in a broader range, while suppressing interference of the laser beam L with the nozzle 34. Furthermore, the material 3 is ejected from the opening 41a to the outside of the nozzle 34. Because the opening 41a is smaller than the beam output opening 42a, the material 3 can be fed to a more precise region.

A wall thickness of each of the first tubular portion 71 and the second tubular portion 72 become smaller toward the negative direction of the Z axis. With this configuration, on the second end 83 that is nearer to the object 2, the wall thickness of the second tubular portion 72 can be reduced. Therefore, the heat transferred from the laser beam L or the object 2 irradiated with the laser beam L to the second tubular portion 72 can be released more efficiently.

The thickness To of the second tubular portion 72 on the second end 83 is smaller than the thickness Ti of the first tubular portion 71 on the first end 78. With this configuration, the heat transferred from the laser beam L or the object 2 irradiated with the laser beam L to the second tubular portion 72 that is nearer to the object 2 can be released more efficiently.

The first tubular portion 71 includes the first end 78 on which the beam output opening 42a opens, the first inner circumferential surface 76 that faces the inside of the beam output path 42, and the second inner circumferential surface 77 that is positioned between the first inner circumferential surface 76 and the first end 78, and that extends in a direction approaching the inner surface 75 in the negative direction of the Z axis. With this configuration, the second inner circumferential surface 77 that is nearer to the first end 78 can be kept distanced from the laser beam L, so that the laser beam L interferes less with the first tubular portion 71.

The melting point of the second tubular portion 72 is higher than the melting point of the first tubular portion 71. With this configuration, it is possible to reduce the chances of the laser beam L or the object 2 irradiated with the laser beam L causing a damage in the second tubular portion 72 that is nearer to the object 2.

The heat transferred to the nozzle 34 from the object 2 including the processing point P irradiated with the laser beam L has a greater effect than the heat transferred to the first tubular portion 71 of the nozzle 34 from the laser beam L passing through the beam output path 42. The second tubular portion 72 extends to a position nearer to the object 2 than the first tubular portion 71 does. Therefore, the melting point of the second tubular portion 72, which is one of the first tubular portion 71 and the second tubular portion 72 positioned nearer to the object 2, is set higher than that of the first tubular portion 71 that is positioned further away from the object 2, so that the effect of the heat transferred to the nozzle 34 from the object 2 irradiated with the laser beam L is reduced.

The second tubular portion 72 that is positioned on the outer side is affected more by the heat transferred from the object 2 including the processing point P irradiated with the laser beam L, than the first tubular portion 71 that is positioned on the inner side. Therefore, when the distance between the first end 78 of the first tubular portion 71 and the object 2 is equal to the distance between the second end 83 of the second tubular portion 72 and the object 2, the melting point of the second tubular portion 72 is set higher than the melting point of the first tubular portion 71.

The inner surface 75 and the outer surface 81 extend in the first converging direction D1 that approaches the central axis Ax toward the negative direction of the Z axis. With this configuration, the nozzle 34 according to the embodiment enables the material 3 and the carrier gas G to become converged by following the inner surface 75 or the outer surface 81, and therefore, the material 3 can be fed to a more precise region.

Second Embodiment

A second embodiment will now be explained with reference to FIGS. 5 and 6. In the explanations of embodiments below, components having the same functions as those having already been explained are appended with the reference numerals that are the same as those having already been explained, and explanations thereof will be sometimes omitted. The components given the same reference numerals do not necessarily have the same functions or properties in entirety, and may include different functions and properties depending on the embodiments.

Figure 5:
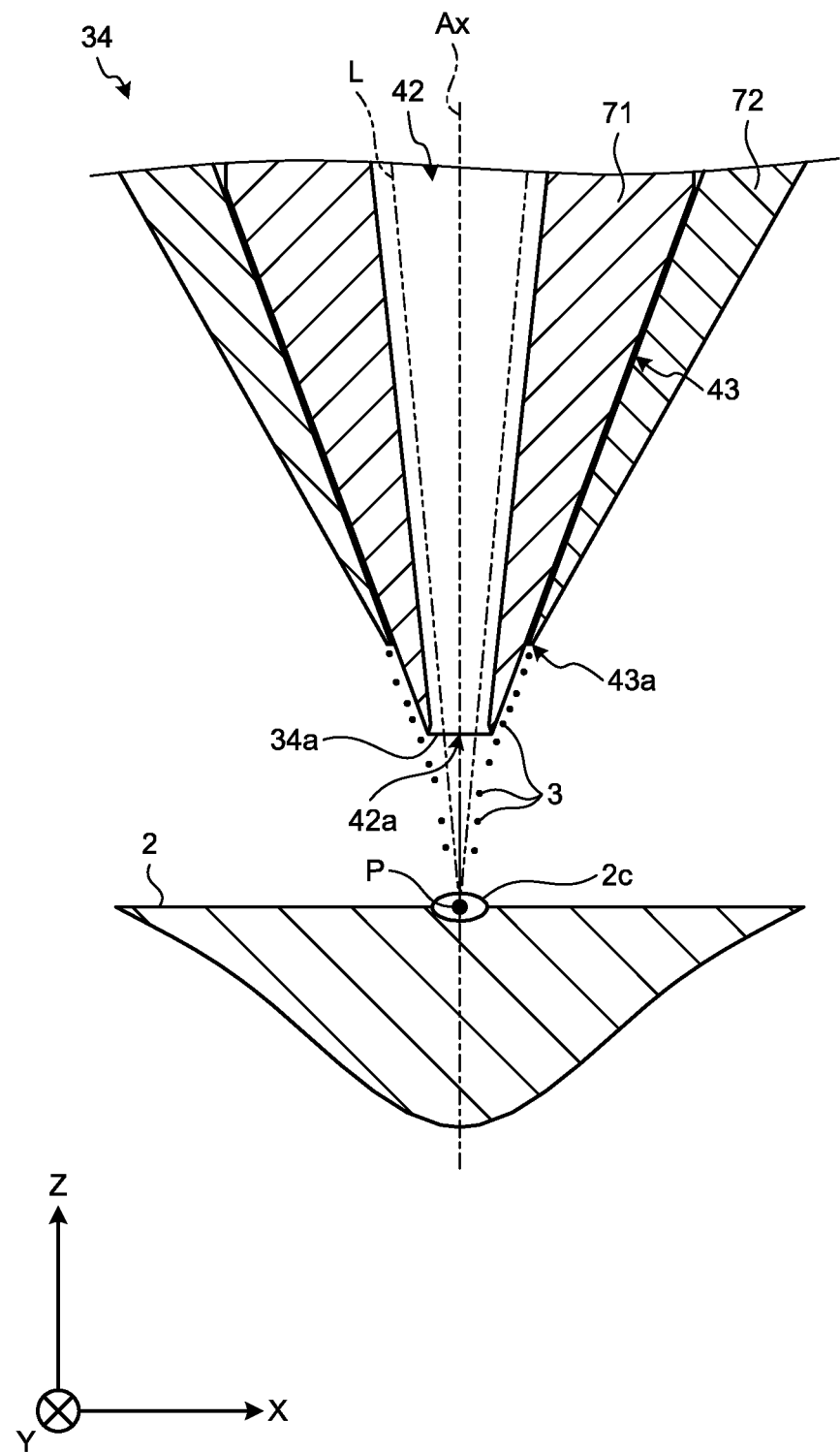
FIG. 5 is an exemplary sectional view illustrating a part of the nozzle and a part of an object according to a second embodiment.
Figure 6:
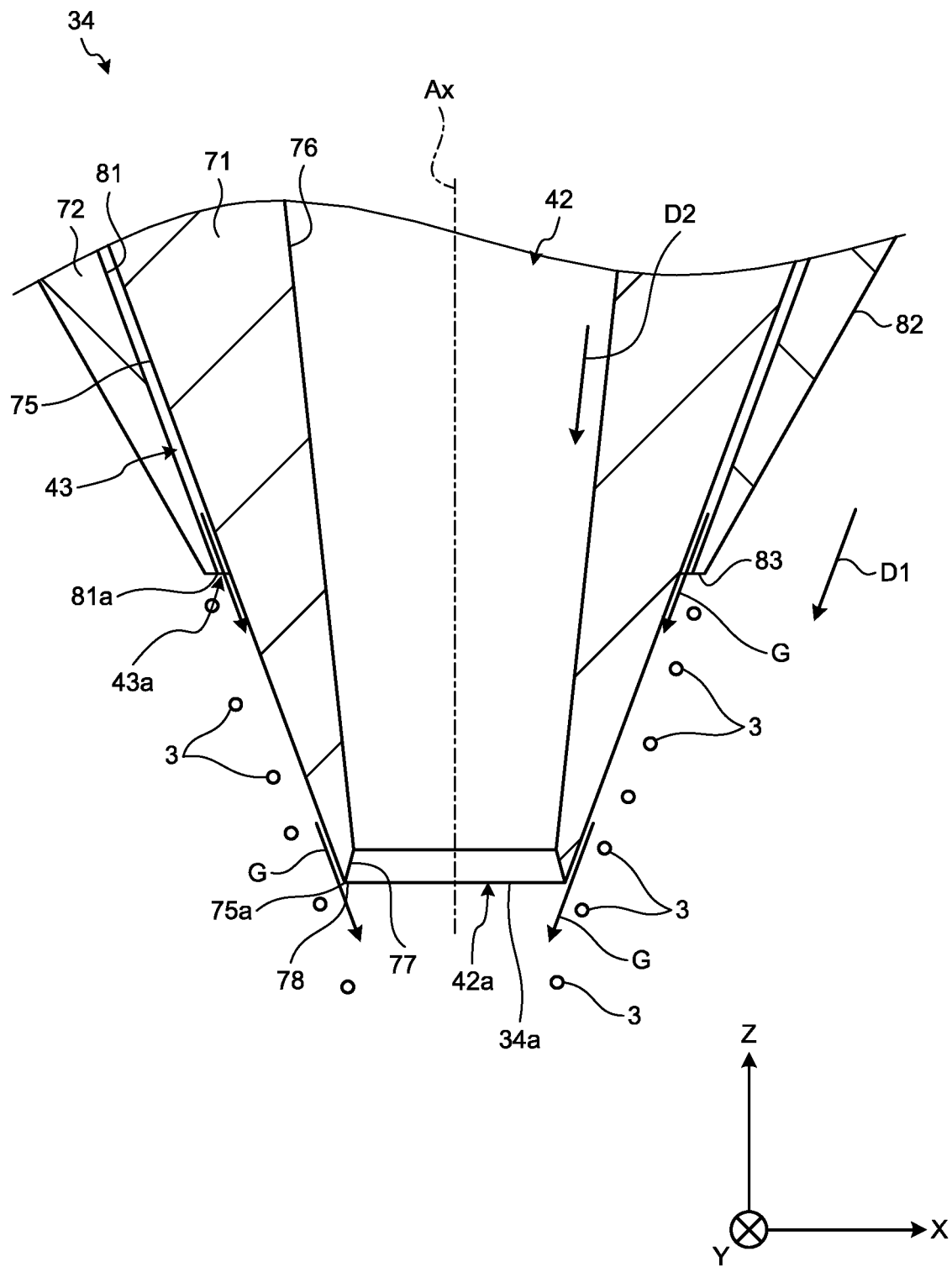
FIG. 6 is an exemplary sectional view illustrating a part of the nozzle according to the second embodiment.

FIG. 5 is an exemplary sectional view illustrating a part of the nozzle 34 and a part of the object 2 according to the second embodiment. FIG. 6 is an exemplary sectional view illustrating a part of the nozzle 34 according to the second embodiment. As illustrated in FIGS. 5 and 6, in the second embodiment, the first lower edge 75a of the inner surface 75 of the first tubular portion 71 is distanced from the second lower edge 81a of the outer surface 81 of the second tubular portion 72 on the side toward the negative direction of the Z axis, in the direction along the central axis Ax. In this manner, in the second embodiment, the inner surface 75 is one example of the second surface, and the first lower edge 75a is one example of the second edge. The outer surface 81 is one example of the first surface, and the second lower edge 81a is one example of the first edge.

In the nozzle 34 according to the second embodiment, the beam output path 42 and the ejection path 43 are provided, but the passage 41 is not provided. The beam output opening 42a of the beam output path 42 and the ejection opening 43a of the ejection path 43 both open to the outside of the nozzle 34.

The ejection path 43 is provided between a part of the inner surface 75 of the first tubular portion 71 and the outer surface 81 of the second tubular portion 72. In other words, the part of the inner surface 75 and the outer surface 81 define at least a part of the ejection path 43. The ejection opening 43a of the ejection path 43 is defined by the inner surface 75 of the first tubular portion 71 and the second lower edge 81a of the outer surface 81 of the second tubular portion 72.

As described above, a part of the inner surface 75 defines at least a part of the ejection path 43, and is positioned in the ejection path 43. A part of the inner surface 75, that includes the first lower edge 75a, is positioned outside of the ejection path 43, and exposed on the outer side in the radial direction. In this manner, the inner surface 75 continues from the inside of the ejection path 43 to the outside of the ejection path 43. Therefore, as indicated by the arrows in FIG. 6, the flow of the carrier gas G ejected from the ejection opening 43a follows the inner surface 75, due to the Coanda effect, for example.

The flow of the carrier gas G following the inner surface 75 becomes separated at the first lower edge 75a, and departs from the nozzle 34. The flow of the carrier gas G departed from the nozzle 34 at the first lower edge 75a generally flows in the first converging direction D1. The material 3 ejected from the ejection opening 43a is carried by the carrier gas G, flows along the inner surface 75 in the first converging direction D1, and is released from the first lower edge 75a toward the object 2.

The flow of the carrier gas G departed from the nozzle 34 at the first lower edge 75a and the material 3 carried by the carrier gas G approach the central axis Ax as the carrier gas G and the material 3 travel further in the negative direction of the Z axis. With this configuration, the material 3 carried by the carrier gas G becomes collected at the processing point P illustrated in FIG. 5. By allowing the processing point P or a vicinity of the processing point P to be irradiated with the laser beam L, the material 3 ejected from the nozzle 34 becomes molten or sintered by the laser beam L.

In the additive manufacturing apparatus 1 provided with the nozzle 34 according to the second embodiment explained above, the material 3 and the carrier gas G ejected from the ejection opening 43a flow along the inner surface 75 up to the first lower edge 75a. Therefore, the nozzle 34 according to the embodiment allows the material 3 and the carrier gas G to become converged by following the inner surface 75, and therefore, the material 3 can be fed to a more precise region. Furthermore, assuming that the wall thickness of the first tubular portion 71 providing the inner surface 75 and that of the second tubular portion 72 providing the outer surface 81 are both reduced by the same amount, because the second tubular portion 72 is positioned on the outer side than the first tubular portion 71 in the radial direction, the amount by which the cross-sectional area is reduced is larger in the second tubular portion 72 than in the first tubular portion 71. Therefore, with the nozzle 34 according to the embodiment, because the cross-sectional area of the second tubular portion 72 can be further reduced, the weight of the nozzle 34 can be reduced further.

In the second embodiment, the first end 78 is distanced from the second end 83 in the negative direction of the Z axis. In other words, the first tubular portion 71 extends to a position nearer to the object 2 than the second tubular portion 72 does. Therefore, the melting point of the first tubular portion 71 that is nearer to the object 2 is set higher than that of the second tubular portion 72 that is more distanced from the object 2. In this manner, the effect of the heat transferred to the nozzle 34 from the object 2 irradiated with the laser beam L is reduced. For example, the first tubular portion 71 is made of tungsten, and the second tubular portion 72 is made of brass. The melting points of the first tubular portion 71 and the second tubular portion 72 are not limited to this example.

According to at least one of the embodiments explained above, the fluid ejected from the second open end is allowed to flow along one of the inner surface and the outer surface, one being whichever extending longer in the first direction, due to the Coanda effect. At the second edge, the Coanda effect ends, and the fluid departs from the nozzle unit, and is released toward the object. Therefore, the nozzle according to the embodiment allows the powder and the fluid to become converged by following the inner surface or the outer surface, and therefore, the powder can be fed to a more precise region.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A nozzle comprising:
a nozzle unit that has an inner surface facing an outer side of an axis in a radial direction and an outer surface facing the inner surface with a space therebetween in the radial direction, and that is provided with a first passage that is distanced from the inner surface on an inner side in the radial direction, that extends along the axis, and through which an energy ray passes, and with a second passage that is provided between the inner surface and the outer surface, and through which powder and fluid pass, wherein
the first passage includes a first open end that is positioned on an end of the first passage in a first direction along the axis, and that opens to outside of the first passage,
the second passage includes a second open end that is positioned on an end of the second passage in the first direction, that is more distanced from the axis than the first open end is, on an outer side in the radial direction, and that opens to outside of the second passage,
a first surface that is the inner surface includes a first edge that is positioned on one end of the first surface in the first direction,
a second surface that is the outer surface includes a second edge that is positioned on one end of the second surface in the first direction, and that is distanced from the first edge on a side toward the first direction, in a direction along the axis,
the nozzle unit ejects the fluid from the second open end so that the fluid flows along the second surface and departs from the nozzle unit with a flow separation at the second edge,
the nozzle unit includes a third passage that communicates with the first open end and the second open end, and through which the energy ray, the powder, and the fluid pass,
the third passage includes a third open end that is positioned on an end of the third passage in the first direction, and that opens to outside of the nozzle unit,
the third open end is smaller than the first open end, and
the nozzle unit ejects the fluid so that the fluid becomes converged at a point outside the nozzle unit.

2. The nozzle according to claim 1, wherein
the nozzle unit has a first tubular portion including the inner surface and provided with the first passage, and a second tubular portion including the outer surface,
a wall thickness of the first tubular portion becomes smaller toward the first direction, and
a wall thickness of the second tubular portion becomes smaller toward the first direction.

3. The nozzle according to claim 2, wherein
the first tubular portion has a first end on which the first open end opens,
the second tubular portion has a second end on which the third open end opens, and
a wall thickness of the second end of the second tubular portion is smaller than that of the first end of the first tubular portion.

4. The nozzle according to claim 2, wherein the first tubular portion has a first end on which the first open end opens, a first inner circumferential surface that faces the inside of the first passage, and a second inner circumferential surface that is positioned between the first inner circumferential surface and the first end, and that extends in a direction approaching the inner surface toward the first direction.

5. The nozzle according to claim 2, wherein a melting point of the second tubular portion is higher than a melting point of the first tubular portion.

6. The nozzle according to claim 1, wherein
the inner surface extends in a second direction to approach the axis diagonally, and
the outer surface extends along the second direction.

7. An additive manufacturing apparatus comprising:
the nozzle according to claim 1;
an optical device that includes an oscillator, the optical device emitting the energy ray with an oscillation of the oscillator and supplying the energy ray to the first passage; and
a feeder that feeds the powder and the fluid to the second passage, wherein
the nozzle enables the energy ray to melt or to sinter the powder ejected from the second open end.

* * * * *